(No Model.)
G. A. BEDGOOD.
GUTTER TILE.
No. 494,620. Patented Apr. 4, 1893.
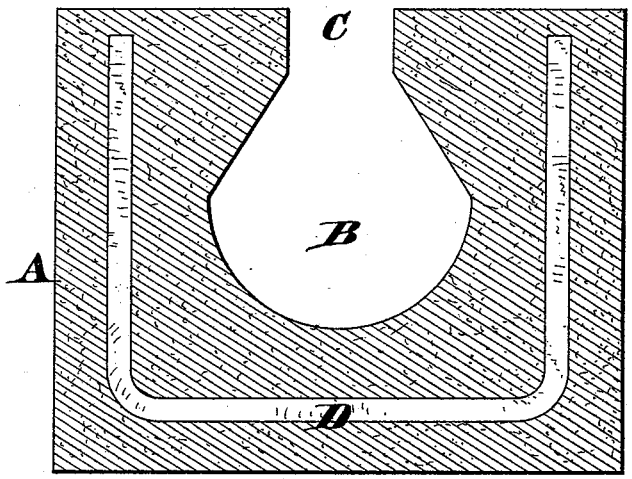
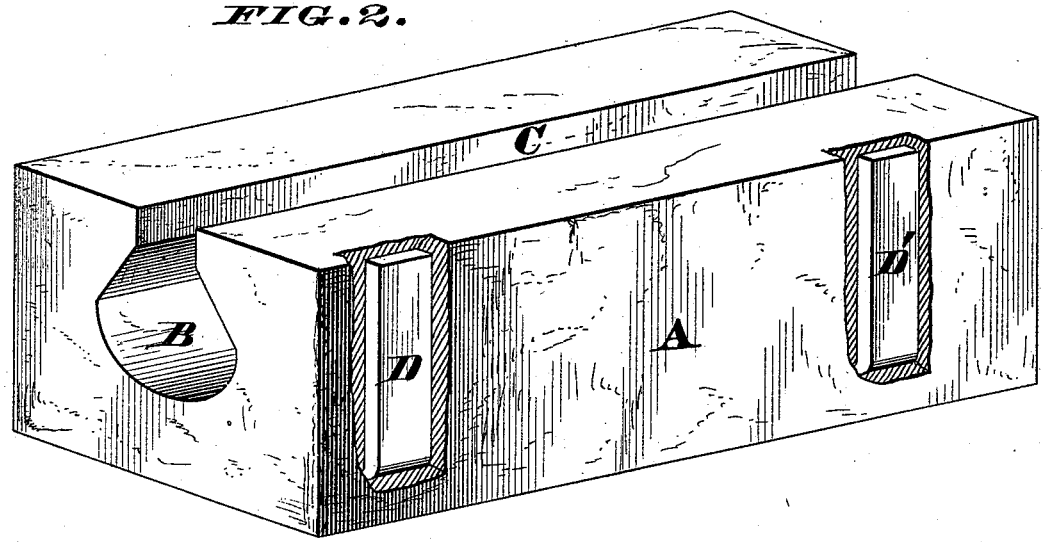

UNITED STATES PATENT OFFICE.

GEORGE A. BEDGOOD, OF CINCINNATI, OHIO, ASSIGNOR OF ONE-HALF TO JAMES C. MULLEN, OF SAME PLACE.

GUTTER-TILE.

SPECIFICATION forming part of Letters Patent No. 494,620, dated April 4, 1893.

Application filed October 24, 1892. Serial No. 449,796. (No model.)

*To all whom it may concern:*

Be it known that I, GEORGE A. BEDGOOD, a citizen of the United States, residing at Cincinnati, in the county of Hamilton and State of Ohio, have invented certain new and useful Improvements in Gutter-Tiles; and I do hereby declare the following to be a full, clear, and exact description of the invention, reference being had to the annexed drawings, which form part of this specification.

The first part of my invention comprises a novel process of manufacturing gutter-tiles and similar conduits, whereby they are rendered non-freezing, the details of said process being hereinafter more fully described.

The second part of my invention consists in inserting metallic-ties within a gutter-tile when it is first molded, which ties are so shaped and applied as to prevent the sides of the tile springing or cracking, as hereinafter more fully described.

In the annexed drawings, Figure 1 is an enlarged transverse-section of a gutter-tile embodying my invention, said section being taken in the plane of one of the metallic-ties. Fig. 2 is a perspective view of such a tile, portions thereof being broken away to expose a pair of these ties.

My process of manufacture is independent of any special size or shape of gutter tile or other similar conduit, and is carried out in the following manner; a good article of hydraulic cement being the principal ingredient used, which cement is mixed with sand, water and salt, substantially as follows. With every bushel of cement I mix about four gallons of water, adding thereto sufficient sand to afford a mass capable of being readily molded to the desired shape, and then one pound of salt is incorporated with said mass, rock salt being preferred, for this purpose. The mass is then molded, and when dried is saturated with crude petroleum, the result being the production of a gutter-tile or conduit within which water can not freeze. I usually mold this tile to the shape more clearly seen in Fig. 2, where A represents one piece or section of gutter-tile or other conduit, and B is a channel or water passage arranged longitudinally of the same, the upper part of said channel being generally contracted to afford a narrow slot C that facilitates the removal of dirt and other obstructions.

D, D', represent a pair of substantially U-shaped metallic-ties inserted within the tile while it is yet in a plastic condition, the object of these ties being to stiffen the sides of the conduit and thus prevent them cracking or springing outwardly, so as to widen the slot C.

I claim as my invention—

1. The within described process of making gutter-tiles and other conduits, which process consists in adding salt to the mass, and when the latter is dried, saturating it with crude petroleum, for the purpose described.

2. The gutter-tile or other conduit A, having a longitudinal channel B, extending from end to end of said tile, a narrow slot C at top, communicating with this channel, and a series of U-shaped metallic-stiffeners D, D', inserted within the sides and bottom of the tile, said stiffeners being separate and distinct from each other, and entirely concealed, all as herein described, and for the purpose stated.

3. A new composition of non-freezing matter, prepared with hydraulic-cement, sand, salt, water and crude petroleum, substantially in the proportions herein described, and for the purpose stated.

In testimony whereof I affix my signature in presence of two witnesses.

GEORGE A. BEDGOOD.

Witnesses:
JAMES H. LAYMAN,
JAMES C. MULLEN.